(12) United States Patent
Grendahl

(10) Patent No.: US 6,906,260 B2
(45) Date of Patent: Jun. 14, 2005

(54) PROTECTIVE COVER PLATE

(76) Inventor: Mark S. Grendahl, 117 Belmont Rd., Apple Valley, MN (US) 55124

( * ) Notice: Subject to any disclaimer, the term of this patent is extended or adjusted under 35 U.S.C. 154(b) by 26 days.

(21) Appl. No.: 10/754,268

(22) Filed: Jan. 9, 2004

(65) Prior Publication Data

US 2004/0188126 A1 Sep. 30, 2004

Related U.S. Application Data

(63) Continuation-in-part of application No. 29/178,220, filed on Mar. 24, 2003.

(51) Int. Cl.$^7$ ................................................ H02G 3/14
(52) U.S. Cl. .............................. 174/66; 174/67; 174/58; 220/241; 220/3.8
(58) Field of Search ............................... 174/50, 48, 53, 174/57, 58, 66, 67, 17 R, 135; 220/3.2, 3.3, 3.4, 3.5, 3.6, 3.7, 3.8, 3.9, 4.02, 241, 242; 248/906; 33/DIG. 10, 528; D13/177, 156

(56) References Cited

U.S. PATENT DOCUMENTS

| | | | |
|---|---|---|---|
| 3,601,276 A | * | 8/1971 | Culpepper ................... 220/3.4 |
| 4,979,633 A | | 12/1990 | Lakey |
| D345,142 S | * | 3/1994 | Porter ........................ D13/156 |
| 5,301,437 A | | 4/1994 | Burke |
| 5,526,952 A | * | 6/1996 | Green ......................... 220/3.8 |
| 5,562,222 A | | 10/1996 | Jordan et al. |
| 5,639,991 A | | 6/1997 | Schuette |
| 5,710,392 A | | 1/1998 | Bordwell et al. |
| 6,103,974 A | | 8/2000 | Erdfarb |
| 6,166,329 A | | 12/2000 | Oliver et al. |
| 6,403,883 B1 | * | 6/2002 | Morgan et al. ................ 174/58 |
| 6,479,749 B1 | | 11/2002 | Vrame |
| 6,520,363 B1 | | 2/2003 | Sullivan |
| 6,538,202 B1 | * | 3/2003 | Shaffer et al. ................ 174/66 |
| 6,608,252 B2 | | 8/2003 | Hurley |
| 6,653,566 B2 | * | 11/2003 | Petak et al. .................. 174/66 |
| 6,681,948 B1 | * | 1/2004 | Santa Cruz et al. ......... 220/3.8 |
| 6,686,540 B2 | * | 2/2004 | Compagnone, Jr. .......... 174/58 |

* cited by examiner

Primary Examiner—Dean A. Reichard
Assistant Examiner—Angel R. Estrada
(74) Attorney, Agent, or Firm—Kinney & Lange, P.A.

(57) ABSTRACT

A reusable protective cover provides a means for sealing off an opening leading into the interior chamber of an electrical outlet box during construction activities to prevent foreign material from entering the chamber. The temporary protective cover has a flat rectangular back plate, a rectangular collar with independently-flexing wall sections, and a flange.

30 Claims, 7 Drawing Sheets

PROTECTIVE COVER PLATE

CROSS-REFERENCE TO RELATED APPLICATION(S)

This application is a continuation in part of application Ser. No. 29/178,220 filed on Mar. 24, 2003 and entitled "Protective Cover Plate", which is incorporated herein by reference.

BACKGROUND OF THE INVENTION

This invention relates to a reusable protective cover for temporarily covering an opening to an electrical outlet box during construction. In conventional construction of commercial and residential structures, electrical outlet boxes are wired and installed within the framework of the structure prior to the installation of interior wall surfaces. Residential outlet boxes are typically installed without a mud ring, while commercial outlet boxes are typically installed with a mud ring mounted to the front of the outlet box. Wall panels, usually wallboard made of gypsum, are installed over the electrical outlet boxes and holes are cut in the panels to expose the boxes. Since the outlet boxes are wired prior to installing the wallboard, the wires are often nicked when a zip drill or router is used to cut through the wallboard and expose the outlet boxes.

After a hole in the wallboard is cut, joint compound is typically applied around the outlet boxes to fill in any gaps around the outlet boxes and remedy any other irregularities in the wallboard. In the process, joint compound often finds it way into the interior of the outlet box, coating the wires and reducing the interior volume of the box. This contamination complicates installation of subsequent electrical components.

In addition, typically the wall surface is painted prior to final installation of the electrical components, resulting in the accumulation of paint on the wires in the outlet box. This paint contamination can make installation of the electrical components more difficult because the colored labeling scheme of the wires is obscured. Now that paint is mainly sprayed onto wall panels, as opposed to rolled, the paint contamination problem has only worsened. As a result, for the foregoing reasons, a need exists for cost-effectively protecting both residential outlet boxes and commercial outlet boxes equipped with mud rings, and the wires contained therein.

Previous attempts have been undertaken to solve these problems, however, these attempts have failed to solve all of the above problems. U.S. Pat. No. 5,639,991 issued to Gail D. Schuette discloses a Utility Box Insert which comprises a plate with two L-shaped posts extending outward from the plate. The Schuette cover recesses within the interior chamber of an electrical outlet box and the L-shaped posts anchor the cover in position by mating with screw holes on the front of the outlet box. Due to its recessed configuration within the box, the Schuette cover shields the wires but does not prevent joint compound from entering the interior of the outlet box, which may hinder the removal of the cover from inside the box. Moreover, before the Schuette cover can be installed, the wires inside the outlet box may need to be compressed to provide sufficient clearance to recess the protective plate inside the outlet box.

U.S. Pat. No. 5,562,222 issued to Raymond L. Jordan et al discloses a Temporary Cover for Electrical Outlet Boxes that comprises a thin cover having a continuous, inwardly extending flange completely surrounding the cover to frictionally engage the inner walls of electrical outlet boxes. The front face of the cover mounts flush with the outer rim of the outlet box to block access to the interior chamber. As such, the cover does not have a recess to act as a guide for cutting away wallboard overlaying the outlet box. In addition, the continuous flange surrounding the cover may lack the flexibility needed to fit into different manufacturers' outlet boxes, which often vary slightly in size. Moreover, due to the cover's complex design, fabricating it from a cost effective and durable material such as galvanized steel sheet may not be feasible.

U.S. Pat. No. 6,520,363 issued to Joseph Sullivan discloses a Temporary Protective Cover for Electrical Outlet Receptacle. The Sullivan cover comprises a thin sheet of stamped metal that has a plurality of claw-shaped catches, having a spring-like character, that extend outward in the plane of a base section and engage the interior walls of an electrical outlet box. When the cover is pressed into the front opening of an electrical box, the cover is held in position by the catches, which clutch the interior walls of the box. The cover's design is not conducive for use with a commercial electrical outlet box equipped with a mud ring.

BRIEF SUMMARY OF THE INVENTION

The invention is a reusable protective cover for temporarily covering an opening leading into the interior chamber of an electrical outlet box during construction activities. The temporary protective cover has a flat rectangular back plate, a rectangular collar extending outward from the back plate, and a flange connected to an outer rim of the rectangular collar. The rectangular collar has four independently-flexing wall sections, wherein at least two of the wall sections are sloped outward to frictionally engage interior surfaces of the electrical outlet box and accommodate different sizes of electrical outlet box openings. The flange is sized to overlap edges of the outlet box opening and seal off the chamber to prevent foreign material from entering the chamber.

While the above identified FIGS. 1–11 set forth preferred embodiments, other embodiments of the present invention are also contemplated, some of which are noted in the discussion. In all cases, this disclosure presents the illustrated embodiments of the present invention by way of representation and not limitation. Numerous other minor modification and embodiments can be devised by those skilled in the art which fall within the scope and spirit of the principals of this invention.

DETAILED DESCRIPTION

Figure 1:
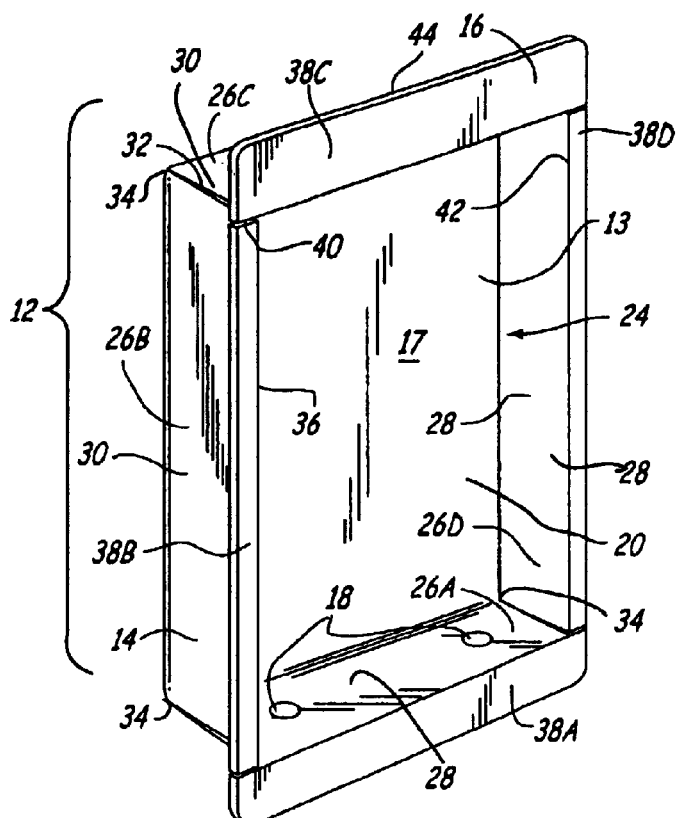
FIG. 1 is a front perspective view of a first embodiment of a protective cover incorporating the present invention.
Figure 2:
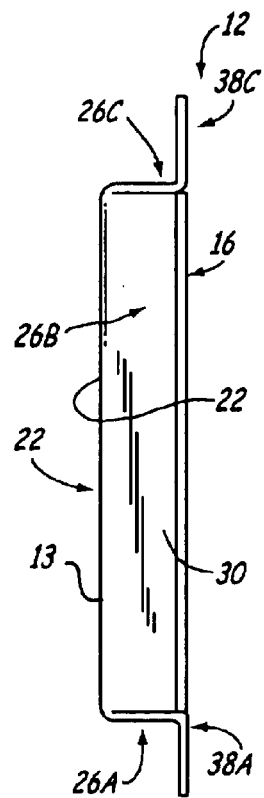
FIG. 2 is a side view of the protective cover of FIG. 1, the other side view being the same as that shown.
Figure 3:
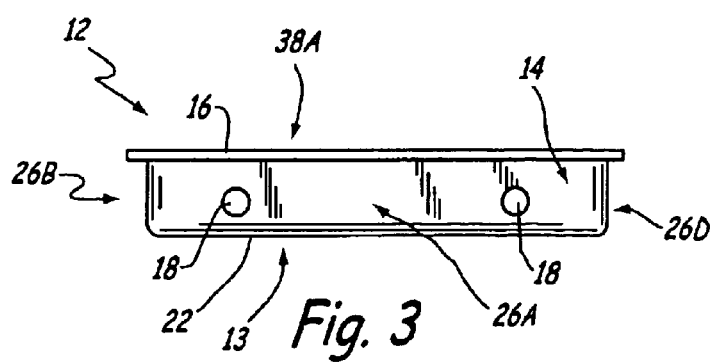
FIG. 3 is an end view of the protective cover of FIG. 1, the other end view being the same as that shown.
Figure 4:
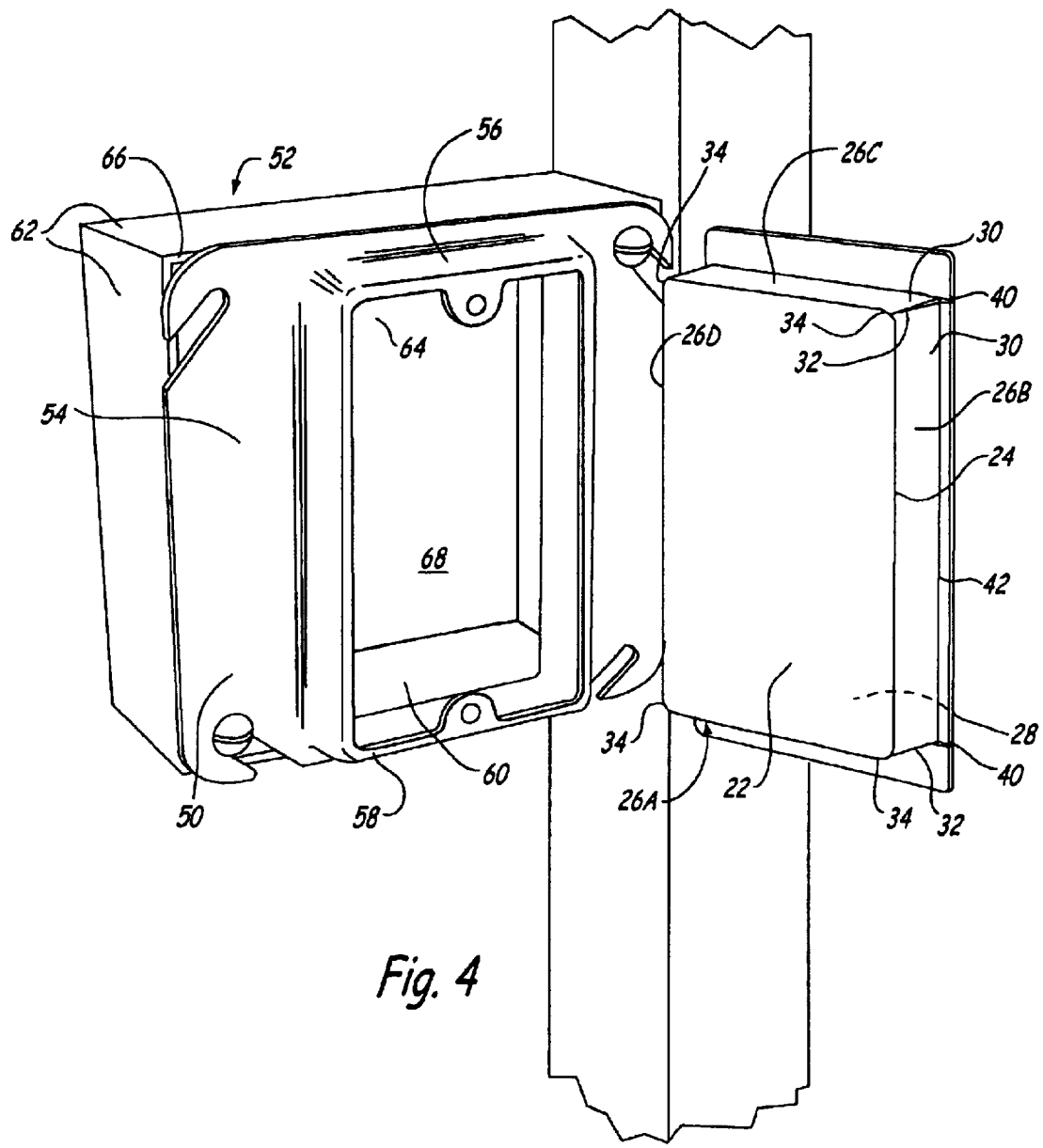
FIG. 4 is a perspective view of the protective cover of FIG. 1 about to be mated with a mud ring mounted to a single electrical outlet box.
Figure 5:
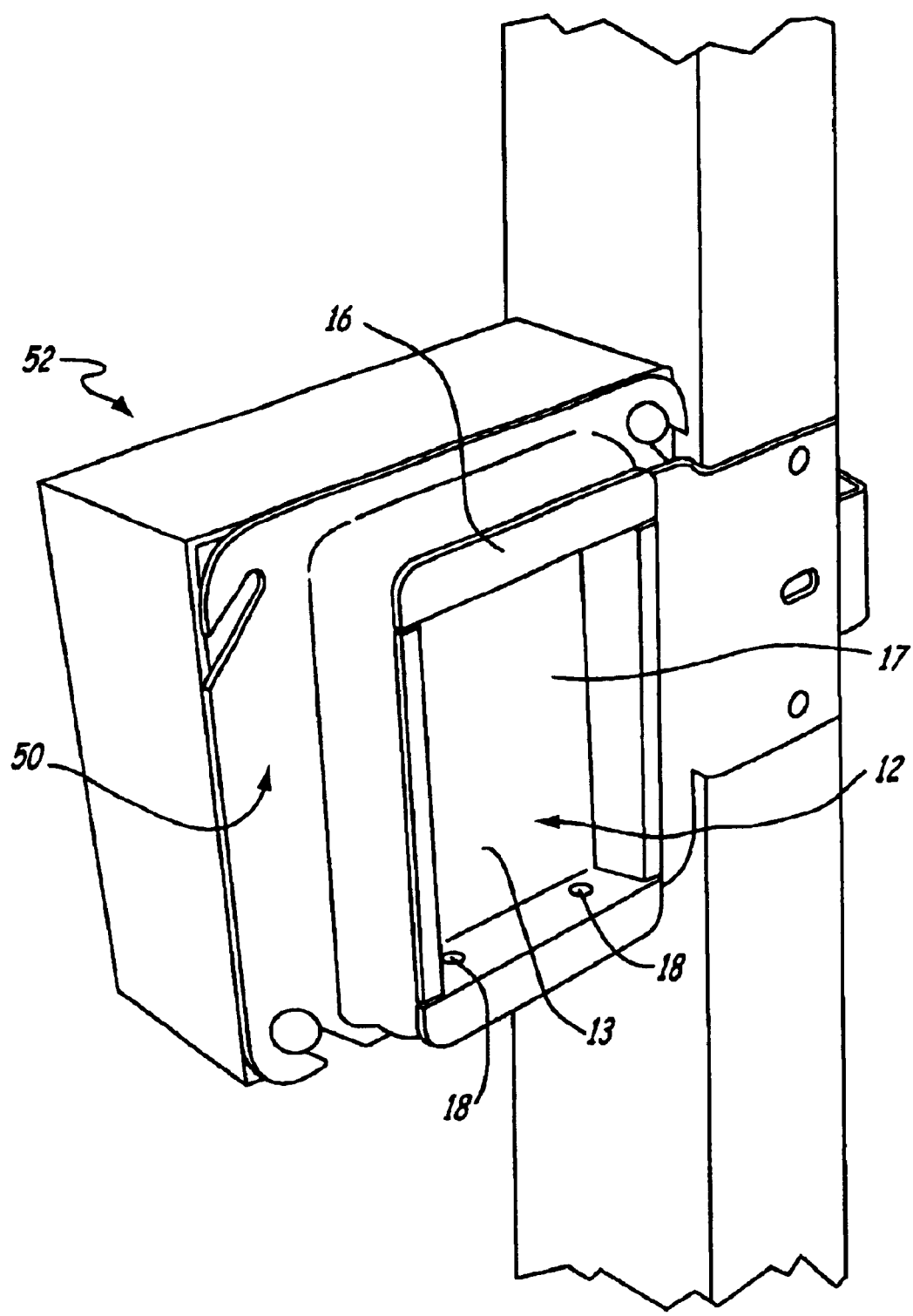
FIG. 5 is a perspective view of the protective cover of FIG. 1 blocking the outlet opening of the mud ring of FIG. 4.

A first preferred embodiment of the present invention, protective cover 12, is shown in FIGS. 1–5, with FIG. 1 showing a front perspective view of protective cover 12, FIG. 2 showing a side view of protective cover 12, FIG. 3 showing an end view of protective cover 12, FIG. 4 showing a rear perspective view of protective cover 12, and FIG. 5 showing a front perspective view of protective cover 12 mated to a mud ring.

Protective cover 12 has a rectangular backplate 13, a rectangular collar 14, a flange 16, a recess 17, and release holes 18. Rectangular backplate 13 has a front face 20, a rear face 22, and a rectangular perimeter 24. Rectangular collar 14 has wall sections 26A, 26B, 26C, and 26D, each of which have an interior face 28 and an exterior face 30. Rectangular collar 14 also has gaps 32, corners 34, and a rim 36. Flange 16 has flange sections 38A, 38B, 38C, and 38D; gaps 40; an inner perimeter 42; and an outer perimeter 44.

Rectangular backplate 13 is preferably a flat, generally rectangular sheet that lies in a plane posterior to the plane of flange 16. Rectangular collar 14 connects rectangular backplate 13 and flange 16. Rectangular backplate 13 and rectangular collar 14 form recess 17. Rectangular collar 14 is formed by wall sections 26A–26D, each of which make up a side of rectangular collar 14. Wall sections 26A–26D connect to rectangular backplate 13 at rectangular perimeter 24 and extend outward towards flange 16. Gaps 32 are located at corners 34 of rectangular collar 16 such that the gaps separate wall sections 26A–26D from each other. Wall sections 26A and 26C, which form the shorter sides of rectangular collar 14, have release holes 18 formed therein. Release holes 18 extend from interior face 28 to exterior face 30 of the wall sections.

Flange 16 connects to rectangular collar 14 along rim 36, and is bounded by inner perimeter 42 and outer perimeter 44, both of which are generally rectangular. Flange 16 is composed of flange sections 38A–38D, which are separated by gaps 40. Gaps 40 extend from inner perimeter 42 at corners 34 to outer perimeter 44, and are continuous with gaps 32. As such, each flange section 38A–38D and its associated wall section 26A–26D make up a unit that flexes independent of adjacent wall and flange sections. Flange sections 38A–38D lie in a plane parallel to back plate 13 and preferably form an angle with respective wall sections 26A–26D slightly greater than 90 degrees.

Wall sections 26A–26D are preferably sloped outward from back plate 13 towards flange 16. To accommodate this slope, inner perimeter 42 of flange 16 is preferably larger than rectangular perimeter 24 of back plate 13.

FIGS. 4 and 5 show perspective views of protective cover 12 interacting with a mud ring 50 mounted on the front of an electrical outlet box 52. Mud rings are typically used in conjunction with electrical outlet boxes for use in commercial applications. Mud ring 50 has a mounting plate 54, a projection ring 56, a lip 58, and an outlet opening 60. Electrical outlet box 52 has sides 62, back 64, rim 66, and interior chamber 68. Mounting plate 54 is secured to electrical outlet box 52 by appropriate means. Projection ring 56, which has a generally rectangular cross-section, extends outward from mounting plate 54 and terminates at lip 58, thereby forming outlet opening 60. Outlet opening 60 leads into interior chamber 68 of electrical box 52.

As discussed above, wall sections 26A–26D are preferably sloped outward from back plate 13 towards flange 16. The wall sections are sloped so that as rear face 22 of rectangular back plate 13 is pressed into outlet opening 60, exterior face 30 of each wall section 26A–26D frictionally engages lip 58. As protective cover 12 is pressed further into outlet opening 60, each flange section 38A–38D contacts lip 58, and the frictional engagement between wall sections 26A–26D and lip 58 secures protective cover 12 in outlet opening 60. The slope on wall sections 26A–26D also allows protective cover 12 to fit mud rings of varying size, which is noteworthy because the sizes of mud ring outlet openings are not fully standardized within the industry.

As discussed previously, the present invention preferably has gaps 32 and 40 located at corners 34 of rectangular collar 14 and flange 16. These gaps allow an attached wall and flange section to flex independently as a discrete unit. The gaps, acting in concert with the slope on the wall sections, ensure that the wall sections will fit tightly against the lip of the mud ring. The gaps also provide additional range of movement for the wall sections, thereby allowing the protective cover to fit inside a range of differently-sized mud ring openings.

As shown in FIG. 5, when protective cover 12 is securely mounted inside mud ring opening 60, interior chamber 68 is sealed off from the surrounding environment. As a result, construction activities such as cutting through overlaid wallboard, applying joint compound, and painting can be carried out without introducing contaminants into interior chamber 68, and without affecting wires contained therein.

Recess 17, which has a cross-section generally the same size as outlet opening 60, provides a convenient means for receiving a zip drill or router. When wallboard is installed over an electrical outlet box sealed off with the present invention, the back plate and wall sections that form the recess provide an ideal means for locating the electrical outlet box and acting as a cutting guide to expose the box. A zip drill or router may then be used to cut through the overlaid wallboard and engage back plate 13 without any danger of damaging wires installed within the outlet box or shocking the person doing the cutting. The drill or router is directed around the perimeter of recess 17 to completely expose back plate 13. Once back plate 13 is exposed, the wallboard overlapping flange 16 can be quickly removed to completely expose the protective cover.

After the surrounding wallboard has been patched and painted, the protective cover may be removed from mud ring opening 60 using release holes 18. To accomplish this, a tool, such as for example a piece of hooked wire, is inserted inside release hole 18 and used to release the protective cover. Preferably the release holes are circular, however, the holes may be of a different shape and may also be located on different wall sections.

Figure 6:
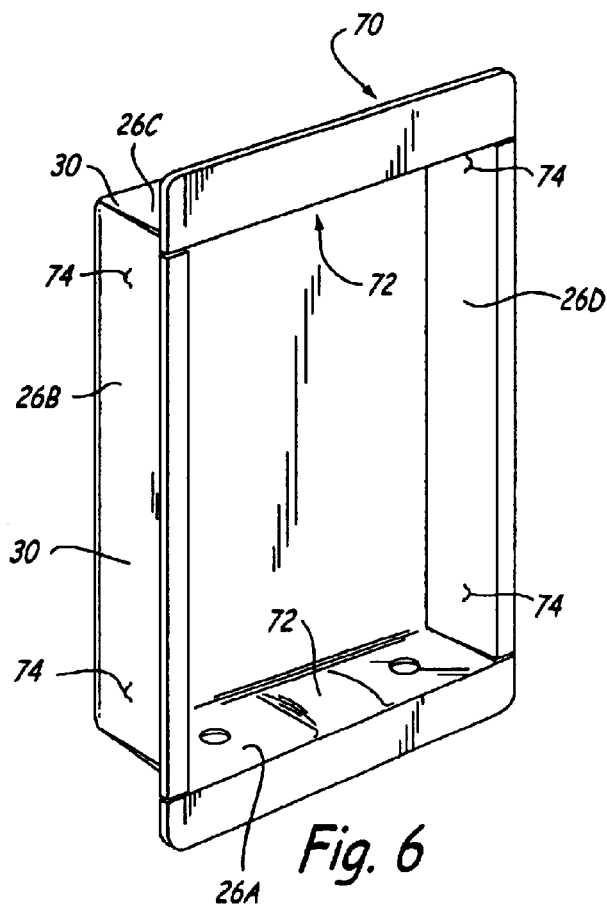
FIG. 6 is a perspective view of a second embodiment of a protective cover incorporating the present invention.
Figure 7:
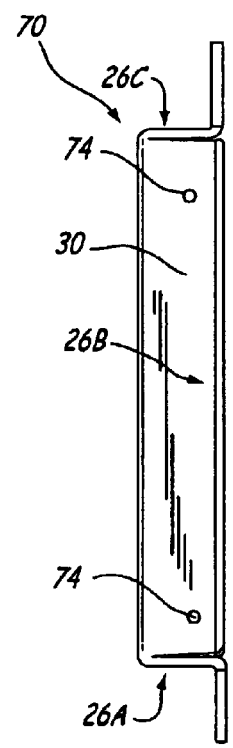
FIG. 7 is a side view of the protective cover of FIG. 6, the other side view being the same as that shown.
Figure 8:
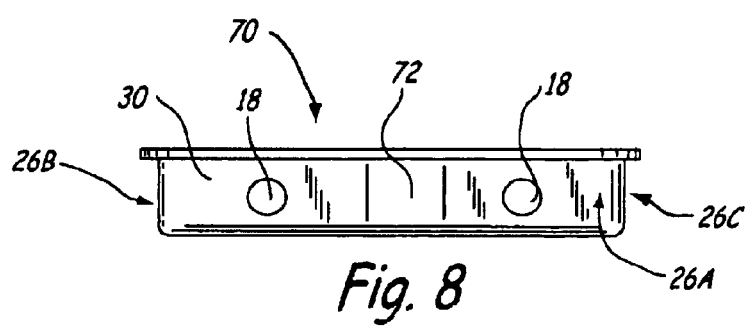
FIG. 8 is an end view of the protective cover of FIG. 6, the other end view being the same as that shown.
Figure 9:
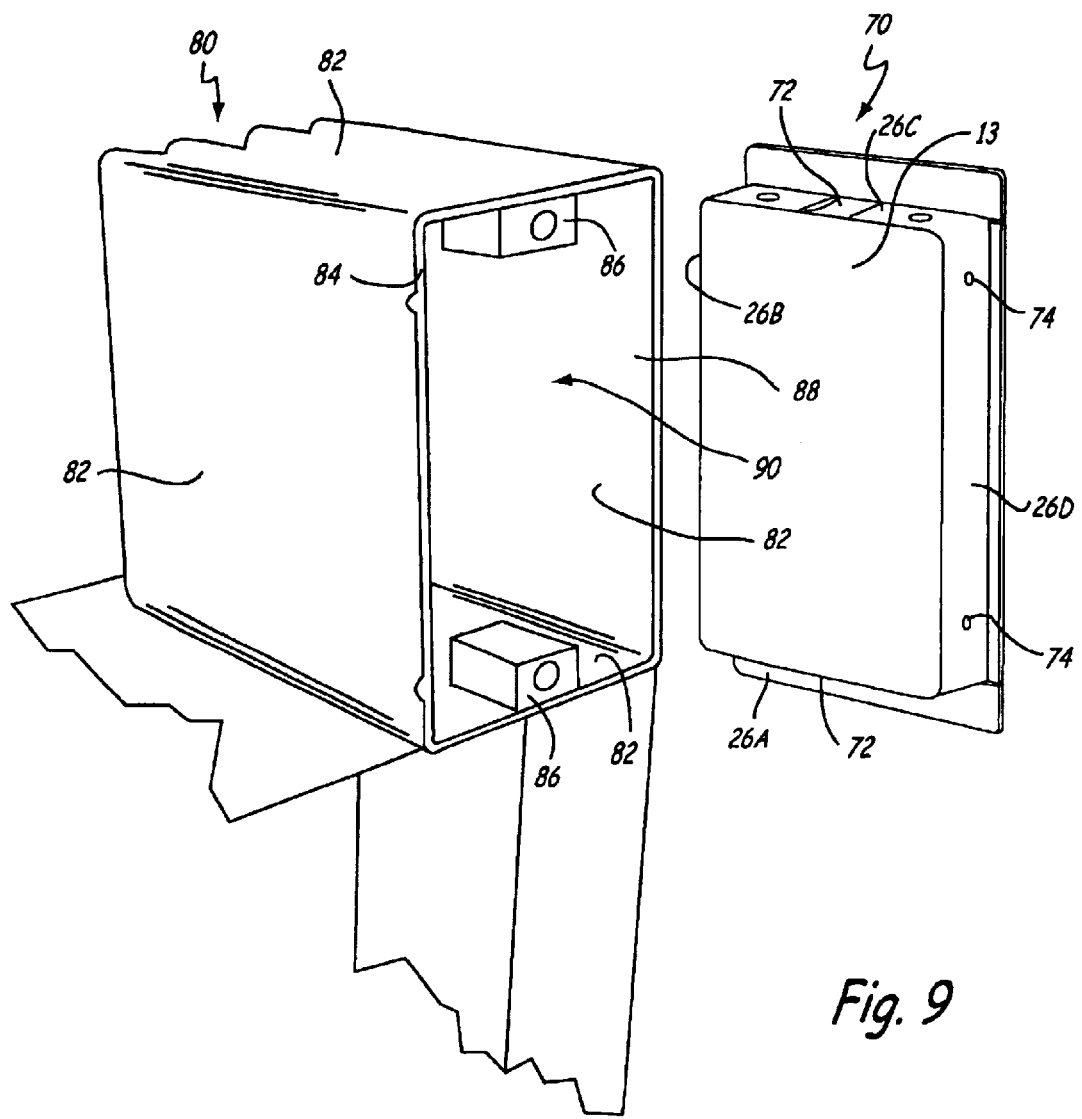
FIG. 9 is a perspective view of the rear side of the protective cover of FIG. 6 about to be mated with a residential electrical outlet box.
Figure 10:
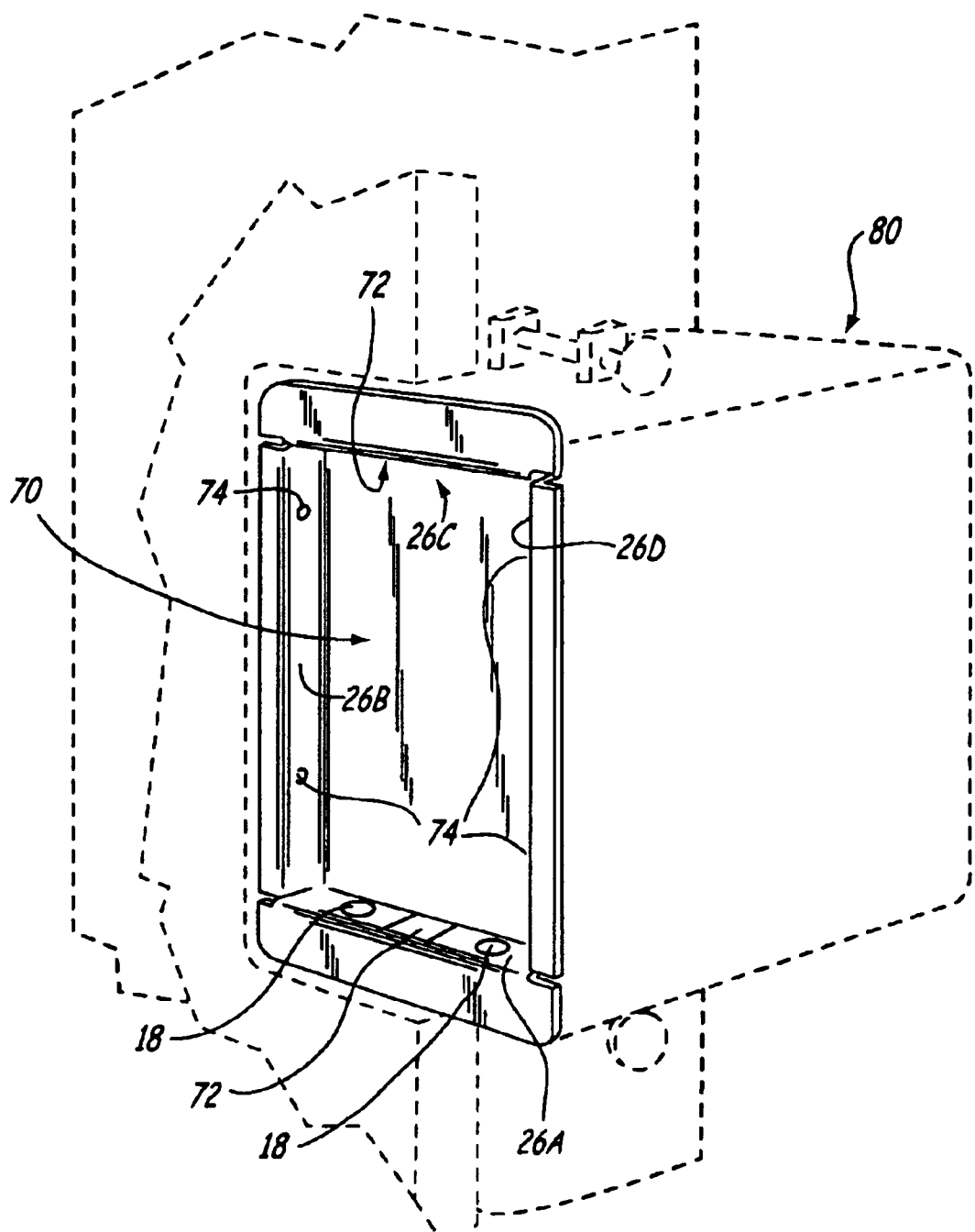
FIG. 10 is a perspective view of the protective cover of FIG. 6 blocking the outlet opening of the residential electrical outlet box of FIG. 10.

Protective cover 70, a second preferred embodiment of the present invention, is shown in FIGS. 6–10, with FIG. 6 showing a front perspective view of protective cover 70, FIG. 7 showing a side view of protective cover 70, FIG. 8 showing an end view of protective cover 70, FIG. 9 showing a rear perspective view of protective cover 70 about to be mated with a residential electrical outlet box, and FIG. 10 showing a front perspective view of protective cover 70 mated with a residential electrical outlet box.

Except for two additional features, indented portions 72 and dimples 74, protective cover 70 is identical to protective cover 12 of FIGS. 1–5. Indented portions 72 protrude outward from wall sections 26A and 26C into recess 17 of protective cover 70. Dimples 74 are formed in wall sections 26B and 26D and protrude outward from exterior faces 30.

FIGS. 9 and 10 show protective cover 70 interacting with residential electrical outlet box 80. Electrical outlet box 80 has sides 82, a lip 84, ribs 86, an outlet opening 88, and a chamber 90. Ribs 86 each have a threaded screw hole to receive a screw for fastening an electrical outlet cover (not shown) to electrical outlet box 80. To seal off chamber 90 of electrical outlet box 80, rear face 22 of protective cover 70 is pressed into lip 84. In the process, sloped wall sections 26A–26D frictionally engage the interior of sides 82 and flex inward towards recess 17. As the wall sections slide further into chamber 90, dimples 74 also frictionally engage sides 82. Dimples 74 are preferably located on the wall sections in close proximity to rim 36 to serve as an additional means for securing protective cover 70 to electrical outlet box 80.

Protective cover 70 is locked in outlet opening 88 by pressing the cover into chamber 90 until the underside surface of flange 16 engages lip 84. As described for protective cover 12 of FIGS. 1–5, protective cover 70 may be removed from electrical outlet box 80 by inserting a tool within release holes 18.

Figure 11:
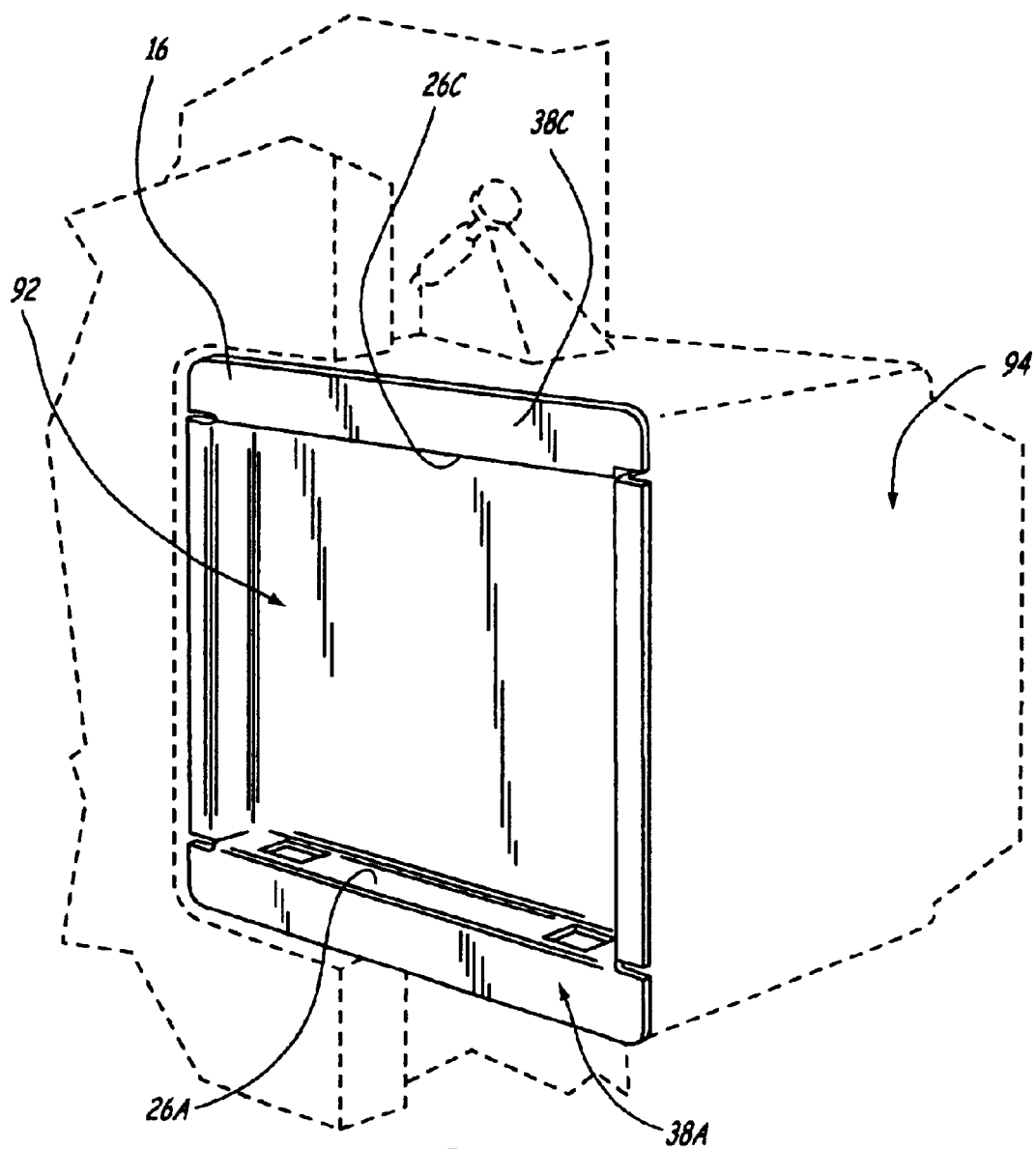
FIG. 11 is a perspective view of a third embodiment of a protective cover incorporating the present invention, shown blocking the outlet opening of a double electrical box, with stud and wallboard in phantom lined.

FIG. 11 shows a perspective view of protective cover 92, a third preferred embodiment of the present invention, mounted in a double electrical outlet box 94. Protective cover 92 is identical to protective cover 70, except it is enlarged to fit double electrical outlet boxes. Rectangular back plate 13, wall sections 26A and 26C, and flange sections 38A and 38C are elongated. However, protective cover 92 is used in the same manner as protective cover 70. It is also contemplated that similar alterations (not shown) may be made to protective cover 12 of FIG. 1 to allow protective cover 12 to mate with a mud ring for a double commercial electrical outlet box.

In one embodiment, protective covers 10, 70, and 92 may be stamped from a single sheet of galvanized steel. Other materials, such as for example plastic or rubber, may also be used, but the materials should preferably be able to resist a zip drill or router bit for a sufficient period of time without becoming compromised.

Although the present invention has been described with reference to preferred embodiments, workers skilled in the art will recognize that changes may be made in form and detail without departing from the spirit and scope of the invention.

What is claimed is:

1. A reusable protective cover for temporarily covering an opening leading into the interior chamber of an electrical outlet box during construction activities, the protective cover comprising:
    a flat rectangular back plate;
    a rectangular collar extending outward from the back plate comprising four independently-flexing wall sections, wherein at least two of the wall sections are sloped outward to frictionally engage interior surfaces of the electrical outlet box and accommodate different sizes of electrical outlet box openings; and
    a flange connected to an outer rim of the rectangular collar, wherein the flange is sized to overlap edges of the outlet box opening and seal off the chamber to prevent foreign material from entering the chamber.

2. The protective cover of claim 1, wherein the flange is made up of four independent flange sections, each one being connected to one of the wall sections.

3. The protective cover of claim 1, wherein the rectangular collar has a pair of indented portions to receive a pair of ribs in the electrical outlet box.

4. The protective cover of claim 1, wherein a gap located at each corner of the rectangular collar spaces each of the four independently-flexing wall sections from adjacent independently-flexing wall sections.

5. The protective cover of claim 1, wherein the rectangular collar has one or more holes to receive a tool for removing the protective cover from the electrical outlet box.

6. The protective cover of claim 1, wherein the flange has a rectangular outer perimeter.

7. The protective cover of claim 1, wherein the protective cover is a single piece of sheet metal.

8. The protective cover of claim 1, wherein the protective cover is plastic or rubber.

9. A temporary protective cover for sealing off front openings of different size mud rings located on electrical outlet boxes, the temporary protective cover comprising:
    a rectangular back plate;
    a rectangular collar extending outward from the rectangular back plate comprising four wall sections and at least one gap that spaces adjacent wall sections from each other, wherein at least two of the wall sections slope outward to frictionally engage an inner rim of the mud ring front opening; and
    a flange connected to an outer portion of the rectangular collar, wherein the flange is sized to overlap an outer rim in the front opening of the mud ring.

10. The temporary protective cover of claim 9, wherein the at least one gap comprises a gap located at each corner of the rectangular collar spaces each of the wall sections from adjacent wall sections and allows each wall member to flex independent of the other wall sections.

11. The temporary protective cover of claim 9, wherein the rectangular collar has one or more holes to receive a tool for removing the temporary protective cover from the mud ring.

12. The temporary protective cover of claim 9, wherein the flange has an outer perimeter that is rectangular.

13. The temporary protective cover of claim 9, wherein the temporary protective cover is a single piece of sheet metal.

14. The temporary protective cover of claim 9, wherein the temporary protective cover is plastic or rubber.

15. A temporary protective cover for covering the front opening of an electrical outlet box having outward edges and a pair of ribs with threaded screw holes, the temporary protective cover comprising:
    a back plate;
    a rectangular collar projecting outward from the back plate, the rectangular collar comprising:
        four wall sections that can flex independent of each other;
        dimples protruding from outer portions of the wall sections to frictionally engage interior sidewalls in the electrical outlet box;
        a pair of indented portions in the wall sections, wherein the indented portions are sized to receive the pair of ribs;
        one or more holes formed in the wall sections to receive a tool for removing the protective cover from the electrical outlet box; and a flange connected to an outer rim portion of the rectangular collar, wherein the flange is sized to seal off the outlet box opening and prevent foreign matter from entering the outlet box.

16. The temporary protective cover of claim 15, wherein a gap between adjacent wall sections is disposed at each corner in the rectangular collar.

17. The temporary protective cover of claim 16, wherein at least two of the wall sections are sloped outward to frictionally engage interior sidewalls of the electrical outlet box.

18. The temporary protective cover of claim 15, wherein the temporary protective cover is single piece of sheet metal.

19. The temporary protective cover of claim 15, wherein the temporary protective cover is plastic or rubber.

20. A removable protective cover for shielding an interior chamber of an electrical outlet box and the contents contained therein, the removable protective cover comprising:

a flat rectangular back plate;

a rectangular collar extending outward from the back plate and terminating at an outer rim, the rectangular collar comprising four independently-flexing wall sections, wherein at least two of the wall sections are sloped outward to frictionally engage surfaces in communication with an opening leading into the interior chamber of the electrical outlet box, the sloped wall sections allowing the rectangular collar to fit different-sized openings; and a flange connected to the outer rim of the rectangular collar, wherein the flange is sized to overlap a lip framing the opening and seal off the opening.

21. The removable protective cover of claim 20, wherein the surfaces that are frictionally engaged by the sloped wall sections are formed by the interior walls of the electrical outlet box.

22. The removable protective cover of claim 20, wherein the opening is a front opening in a mud ring and the surfaces that are frictionally engaged by the sloped wall sections are formed by edges defining the front opening of the mud ring.

23. The temporary protective cover of claim 20, wherein a gap, located at each corner of the rectangular collar where adjacent independently-flexing wall sections meet, spaces each of the four independently-flexing wall sections from adjacent independently-flexing wall sections.

24. A protective cover for temporarily covering an opening leading into an interior chamber of an electrical outlet box during construction activities, the protective cover comprising:

a rectangular back plate;

a rectangular collar extending outward from the back plate and terminating at an outer rim, the rectangular collar comprising four independently-flexing wall sections, wherein at least two of the wall sections are sloped outward to frictionally engage surfaces in communication with the opening leading into the interior chamber of the electrical outlet box to secure the protective cover inside the opening; and a plurality of gaps, wherein each gap is located between two of the independently-flexing wall sections.

25. The protective cover of claim 24, wherein the rectangular backplate is flat.

26. The protective cover of claim 24, wherein each of the plurality of gaps is located at a different corner of the rectangular collar.

27. The protective cover of claim 24, wherein the protective cover has four gaps.

28. The protective cover of claim 24, wherein the protective cover has at least one hole formed therein to receive a tool for removing the protective cover from the electrical outlet box.

29. The protective cover of claim 24, wherein two of the wall sections each have an indented portion to receive a pair of ribs located on the electrical box proximate to the front opening and having threaded screw holes.

30. The protective cover of claim 24 further comprising:

a flange connected to the outer rim of the rectangular collar, wherein the flange is sized to overlap at least one edge of the electrical outlet box opening.

* * * * *